United States Patent
Hori et al.

[11] Patent Number: 5,341,413
[45] Date of Patent: Aug. 23, 1994

[54] COMMUNICATION EQUIPMENT WITH A DESTINATION AREA ON-LINE DISPLAY FUNCTION

[75] Inventors: Yasuro Hori; Soshiro Kuzunuki, both of Katsuta; Shuichi Okabe, Yokohama; Fumitaka Ito, Inba, all of Japan

[73] Assignee: Hitachi, Ltd., Tokyo, Japan

[21] Appl. No.: 932,578

[22] Filed: Aug. 20, 1992

[30] Foreign Application Priority Data

Aug. 21, 1991 [JP] Japan ............... 3-209150

[51] Int. Cl.⁵ ............... H04M 11/00; H04N 1/42
[52] U.S. Cl. ............... 379/100; 358/440; 358/444; 358/443; 358/434
[58] Field of Search ............... 379/100, 354, 355, 356, 379/216, 96, 97, 94, 93; 358/440, 444, 443

[56] References Cited

U.S. PATENT DOCUMENTS

| | | | |
|---|---|---|---|
| 4,352,012 | 9/1982 | Verderber et al. | 358/440 |
| 4,741,021 | 4/1988 | Kotani et al. | 379/100 |
| 4,764,951 | 8/1988 | Kotani et al. | 379/100 |
| 4,885,580 | 12/1989 | Noto et al. | 379/354 |
| 5,216,709 | 6/1993 | Wen et al. | 379/354 |

FOREIGN PATENT DOCUMENTS

| | | | |
|---|---|---|---|
| 0212056 | 8/1989 | Japan | 379/53 |
| 0215165 | 8/1989 | Japan | 379/354 |
| 0300655 | 12/1989 | Japan | 379/216 |
| 0047958 | 2/1990 | Japan | 379/354 |
| 0254842 | 10/1990 | Japan | 379/354 |
| 2285840 | 11/1990 | Japan | H04M 1/274 |
| 0030559 | 2/1991 | Japan | 379/216 |
| 0034663 | 2/1991 | Japan | 379/354 |

*Primary Examiner*—Curtis Kuntz
*Assistant Examiner*—Stella L. Woo
*Attorney, Agent, or Firm*—Antonelli, Terry, Stout & Kraus

[57] ABSTRACT

A communication equipment has a dictionary file for areas and destination names corresponding to destination numbers entered by a destination entry unit such as a dialer. The dictionary file is looked up by a retrieval unit during the entry of the number and the retrieved area name and destination name are informed by an informing unit so that an entry error of the area name and the destination name can be detected during the entry of the destination and the error is corrected.

11 Claims, 6 Drawing Sheets

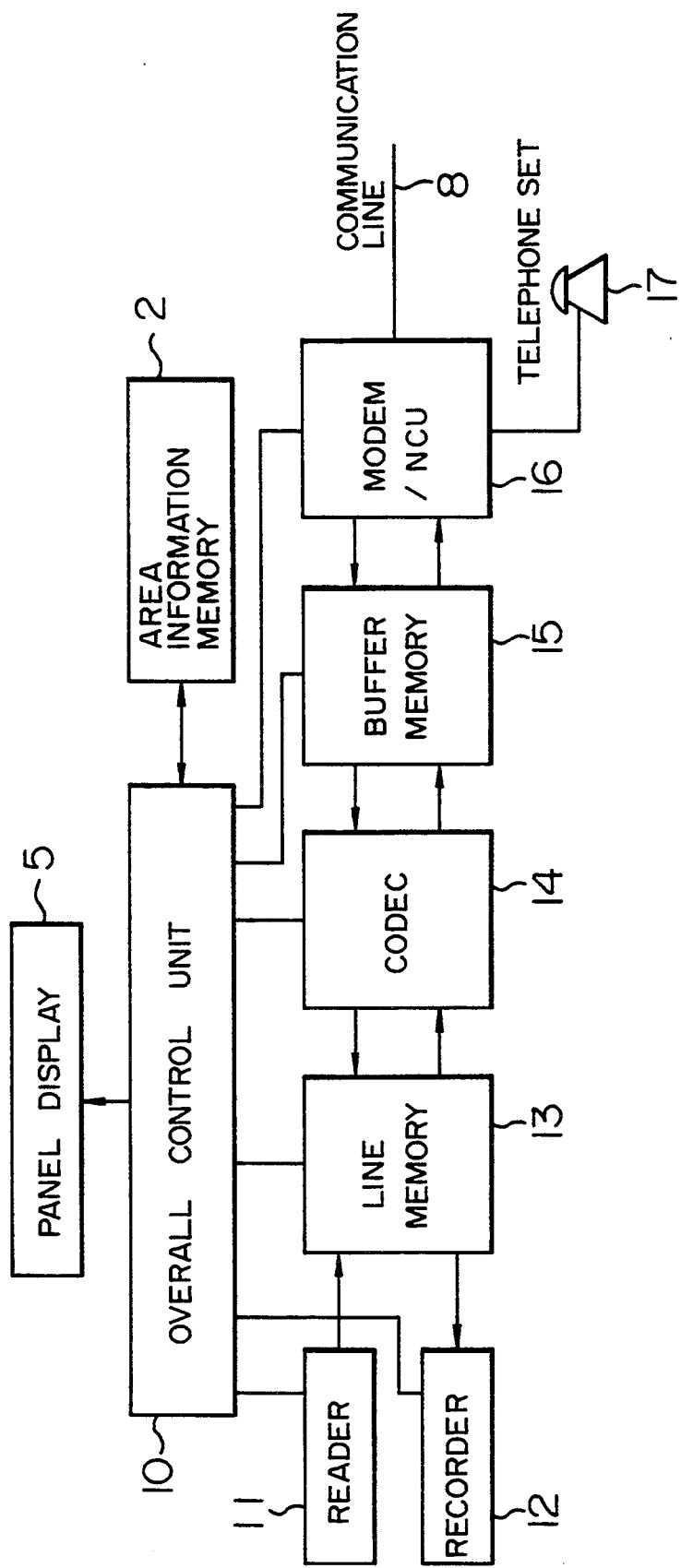

DOCUMENT SHEET
WITH MARK SHEET

COMMUNICATION EQUIPMENT WITH A DESTINATION AREA ON-LINE DISPLAY FUNCTION

BACKGROUND OF THE INVENTION

The present invention relates to a communication equipment and a communication system for business or home use, and more particularly to a facsimile device or a telephone set.

In the facsimile device and the telephone set, a number of communication, a destination is entered by a dial, such buttons or a touch key. In the present age of information communication, the number of communication lines has increased and the number of connectable areas also has increased. More than ten digits are needed to be entered and wrong facsimile communication due to wrong dialing and wrong telephone calls are increasing more and more. In case of telephone, the wrong call may be noticed when a people at the destination station responses and the impact is small. However, it is big disturbance when a wrong call is made during sleeping at midnight. In case of the facsimile device, the impact is serious. The wrong dialing may not be noticed unless the receiving people informs it, and then is a risk of leakage of confidential information. In the past, in order to avoid the entry of multi-digit number, it is registered into a shortened number (see U.S. Pat. No. 4,741,021), or a number associated with a destination name is stored and the destination name or a portion of the number is entered (see JP-A-2-285840), or a personal correspondence function or an encryption function is used in the facsimile device. However, such method is not applicable to a destination having no communication before, and an encryption device is complex and expensive.

SUMMARY OF THE INVENTION

It is an object of the present invention to provide a communication system which prevents wrong connection due to wrong dialing of a destination station and prevents disturbance of the destination people and leakage of confidential information.

In order to achieve the above object, the present invention is provided with an address dictionary file associated with destination numbers and a display unit for the file, while the destination number is entered, an area of the destination number and a name of the destination station are on-line displayed so that an operator can confirm them before sending to prevent wrong transmission.

Namely, an area name dictionary file associated with country codes, area codes and phone numbers of destination stations is provided and it is referred to when the number is entered. It is displayed on a display together with an address number for confirmation and necessary correction by the operator before he/she starts the transmission. The last digit of the destination number corresponds to the destination name. While it is difficult to enter the entire information, it is effective to prevent the error if even the address used before is stored. The effect is further enhanced if a confirmation function to receive the destination name from the destination station during the call to the destination station is added. (In the existing device, the destination station information is not available until the connection with the destination station is made.)

BRIEF DESCRIPTION OF THE DRAWINGS

FIG. 8 shows an overall configuration of a facsimile device in accordance with the present invention.

DESCRIPTION OF THE PREFERRED EMBODIMENTS

A first embodiment of the present invention is now explained with reference to FIGS. 1 and 2.

Figure 1:
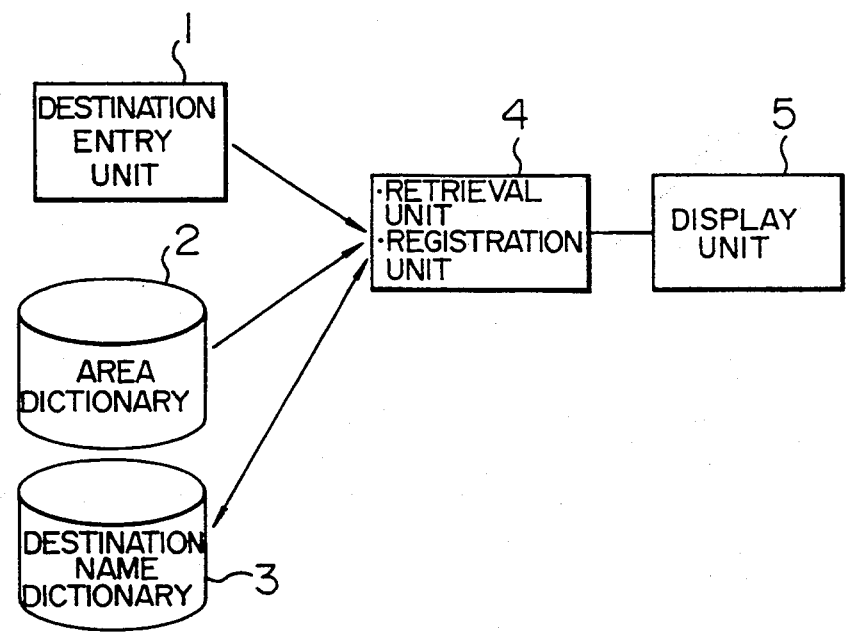
FIG. 1 shows a first embodiment of the present invention.
Figure 2:
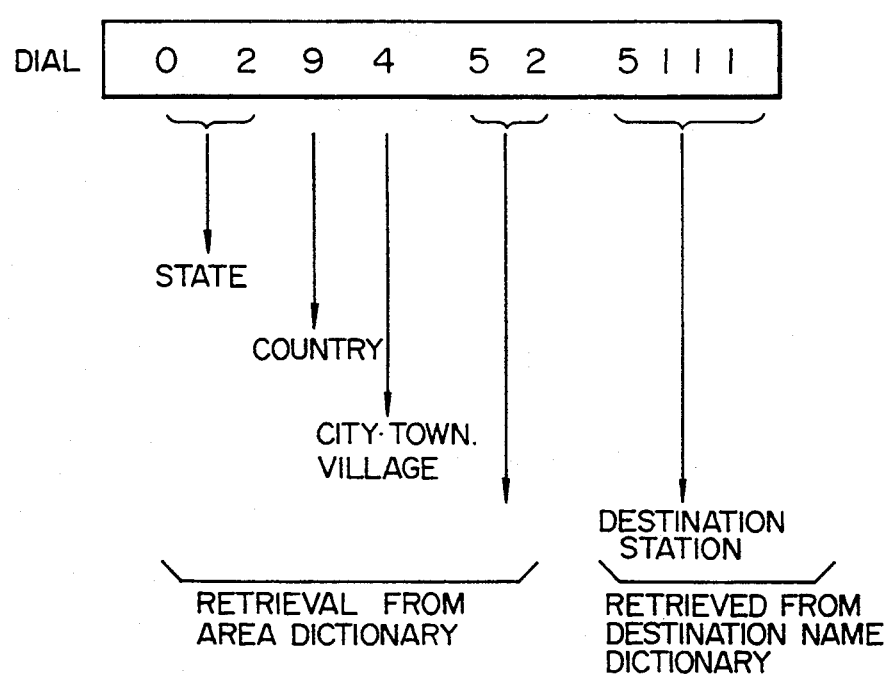
FIG. 2 shows an example of display in the first embodiment of the present invention.

FIG. 1 shows a configuration of the present invention which comprises a destination number entry unit 1 such as a dialer or a push-button device, an area dictionary file 2 for an area of the destination number, a destination name file 3, a retrieval unit 4 for the area and the destination name, and a display unit 5. FIG. 2 shows an example of display of the destination number and the area and the destination name. When the destination number is entered by the entry unit 1, the dictionary files 2 and 3 are looked up by the retrieval unit 4 based on the entered number, and the corresponding area name and destination name as well as the destination number are displayed by the display unit 5. As shown in FIG. 2, since the area name and the destination name are sequentially displayed in association with the digits of the destination number, the operator can enter the destination number while he/she monitors the information and can make correction as required so that he/she can start the transmission without fear of error. Where the destination number is pre-registered and the connection to the destination station is made by a shortened number, only the destination name may be displayed in association with the registered destination number so that the misentry due to operator's wrong memory of the shortened number can be prevented. The area dictionary file 2 stores the area names for the numbers based on the area codes and the phone numbers and it stores the area names in as much detail as possible such as by country, by area (state), by prefecture (county) and by city, town or village. The destination name file stores destination names currently known and destination names of former communication together with the destination numbers. Since a memory of a large capacity is required to display all destination stations, this is practically not possible and whether to store the destination name or not can be selected or updated by the operator by manipulating a button. Thus, only the selected destination names are displayed but since the area name of the destination number is fully displayed, it is effective.

In another application of the present invention, information of its own station is registered in the area dictionary file and a function to automatically send sending station information from the sending station is added so that the sending station information can be displayed on the display unit before the receiving station hooks off a hand set (while a calling ring is generated). In this manner, since the sending station information is noticed to the receiving station, the wrong call or mischievous call can be prevented.

Figure 3:
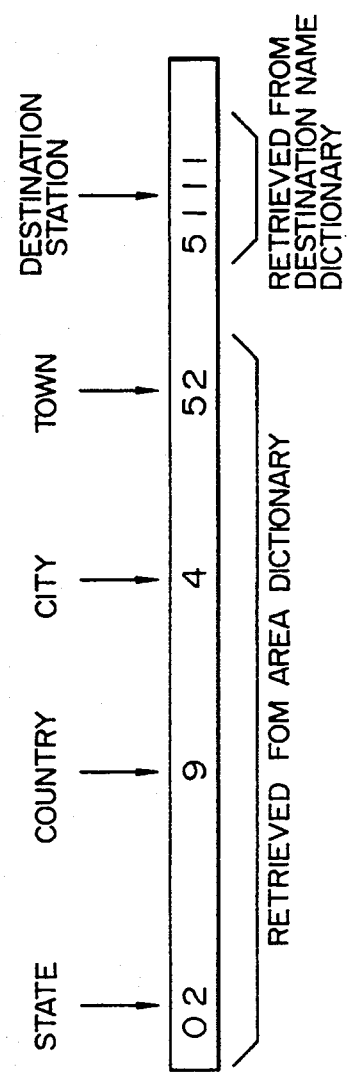
FIG. 3 shows a second embodiment of the present invention.

FIG. 3 shows a second embodiment of the present invention. In the present embodiment, contrarily to FIG. 2, an area name and a destination name are entered and the corresponding numbers are retrieved and displayed and outputted. If only one number is not retrieved, candidate numbers are displayed and one of them is selected by a mouse, a light pen, a touch panel or entering a selection number. For example, when a family name is entered, a plurality names are displayed and the user can select a desired one.

Further, any of the number and the area name may be used depending on the memory of the operator. For example, a prefecture (county) name and a city name may be entered and then last four digits may be entered. In this case, the number is displayed when the area name is entered, and the area name and the destination name are displayed when the number is entered. In this manner, the destination name and number can be checked before the start of the transmission.

Figure 4:
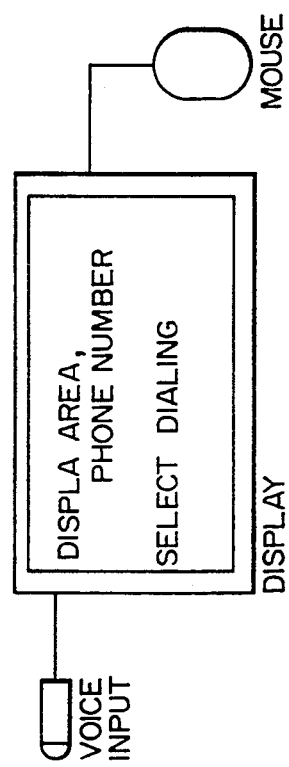
FIG. 4 shows a third embodiment of the present invention.

FIG. 4 shows a third embodiment of the present invention. It enters a number or an area name by a voice input and outputs corresponding area name and number. In this case, the voice input may be replayed when the corresponding area name and number are displayed on the display. The output by the voice is based on the information retrieved by the retrieval unit and the input voice of the operator is not outputted.

Figure 5:
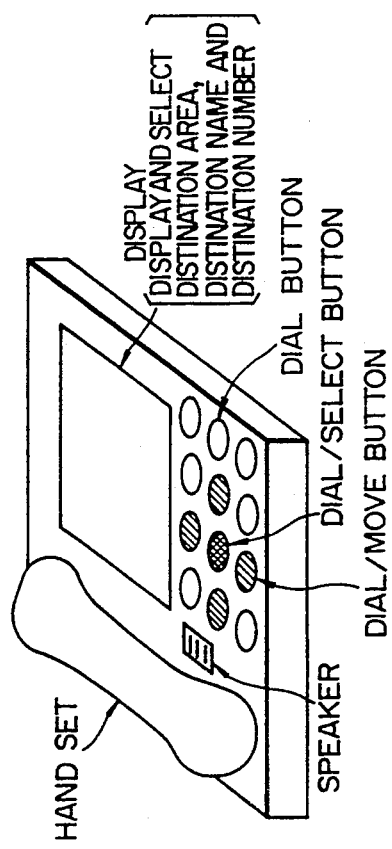
FIG. 5 shows a fourth embodiment of the present invention.

FIG. 5 shows a fourth embodiment of the present invention. A telephone set or a facsimile device is provided with a display, and an area name and a destination name corresponding to an entered number are displayed. When a plurality of candidates are displayed, a cursor is moved by a move button and a desired one is selected by a select button. In this manner, wrong telephone or facsimile call is prevented. Further, the selected area name and destination name may be outputted by voice. A microphone of a hand set may be used to input and output voice.

Figure 6:
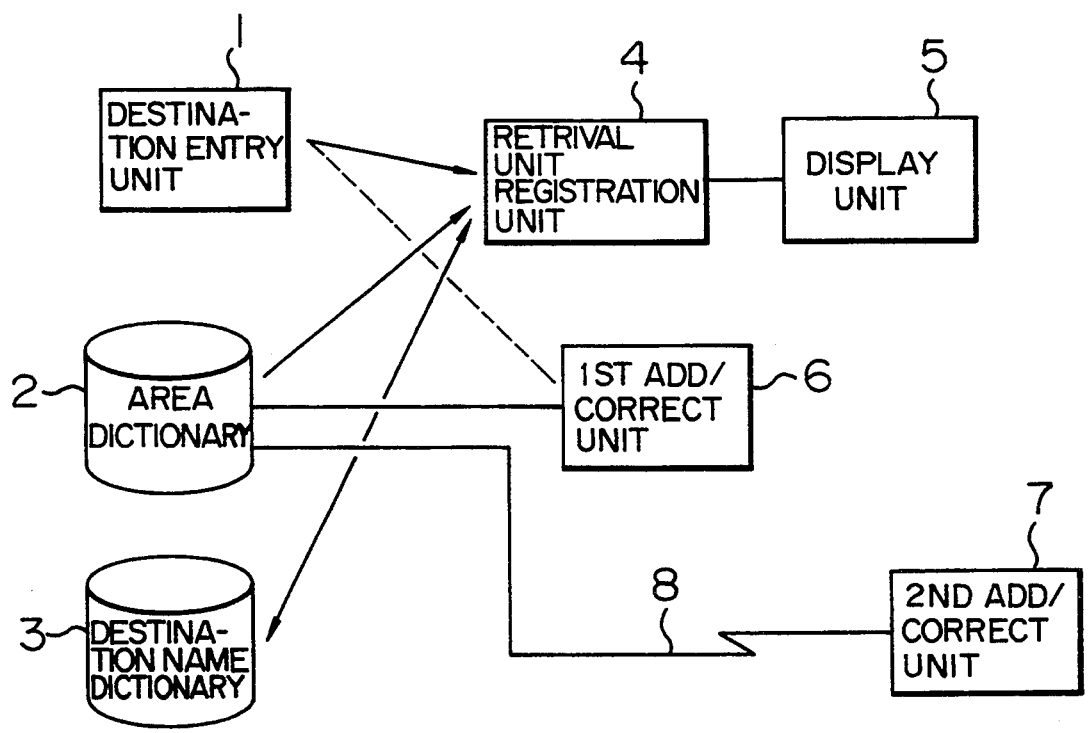
FIG. 6 shows a fifth embodiment of the present invention.

FIG. 6 shows another embodiment of the present invention. In the present embodiment, correct/add unit for the area dictionary file 2 is added to the configuration of FIG. 1. Numeral 6 denotes first add/correct unit for adding to or correcting the area dictionary file 2. The add/correct unit 6 includes the registration unit provided in FIG. 1 together with the retrieval unit 4, and it is provided separately from the retrieval unit. Numeral 7 denotes second add/correct unit for adding to or correcting the area dictionary file 2 through a communication line 8.

By the provision of the add/correct unit of the area dictionary file, the change of the area code and the change of the phone number can be flexibly processed.

When maintenance people of the communication equipment collectively adds or corrects through the communication line, it is very effective and the latest status can always be maintained. The operator can add or correct by using the first add/correct unit without using the communication line.

Figure 7:
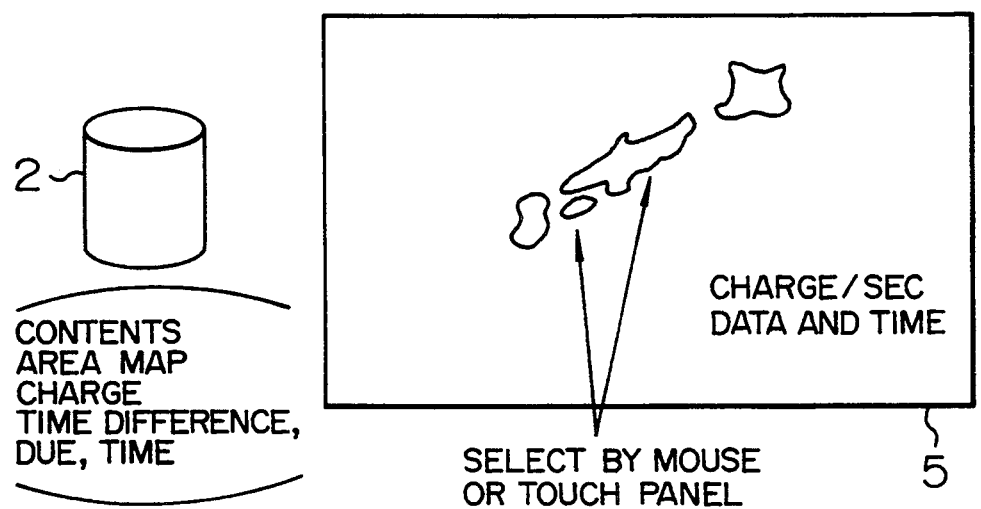
FIG. 7 shows a sixth embodiment of the present invention.

FIG. 7 shows a further embodiment of the present invention. Maps of areas, telephone charges per unit time, and time differences and dates and times of cities of foreign countries are stored in the area dictionary 2 and they are displayed on the display. In this manner, the information of the destination station can be roughly grasped. A plurality of area maps which are candidates of the destination station may be displayed so that the operator may select a desired one by a mouse a light pen or a touch panel. Since the operator can select the area code and the phone number, the number of digit sets to be entered is reduced and a chance of error is lowered.

FIG. 8 shows an overall system configuration when the present invention is applied to a facsimile system. A communication line 8 and a telephone set 17 are connected to a modem 16 in a facsimile device, and the modem 16 is connected to a buffer memory 15 and an overall control unit 10 which comprises the retrieval unit 4 and the first and second add/correct units 6 and 7 described above and controls a memory transfer command, a read/write command and a display command for area information. The information stored in the buffer memory 15 is converted to an image signal from a coded signal by a CODEC 14 and it is sent to a line memory 13. The line memory 13 sequentially sends the stored image information to a printer 12 which outputs the transmitted image information on a record sheet. The above connection is described primarily based on the received signal. The transmission is now briefly explained.

The operator sets a document sheet to be transmitted in a reader 11 and enters a destination number through the telephone set 17. Where the destination number is recorded on the document sheet, the telephone set is not necessary as will be explained later. After the destination number has been set and confirmed, the operator depresses the button of the telephone set 17 or other transmission button (not shown) to send the send command to the overall control unit 10. The overall control unit 10 issues a start of read command to the reader 11, which starts the reading. The reader 11 sends the read image to the line memory 13 as an image signal, which is sent from the line memory 13 to the CODEC 14, which in turn encodes the image signal and sends it to a destination facsimile device through the buffer memory 15 and the modem 16.

Figure 9A:
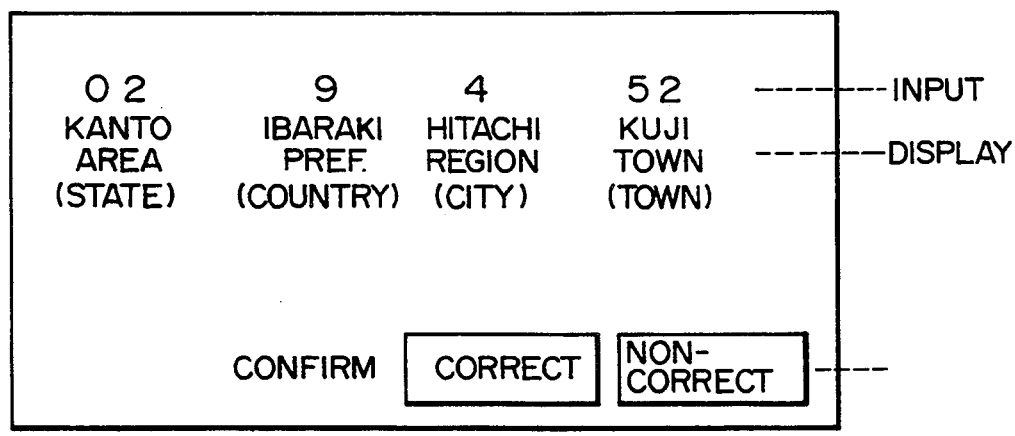
FIG. 9A shows an example of display in FIG. 8.
Figure 9B:
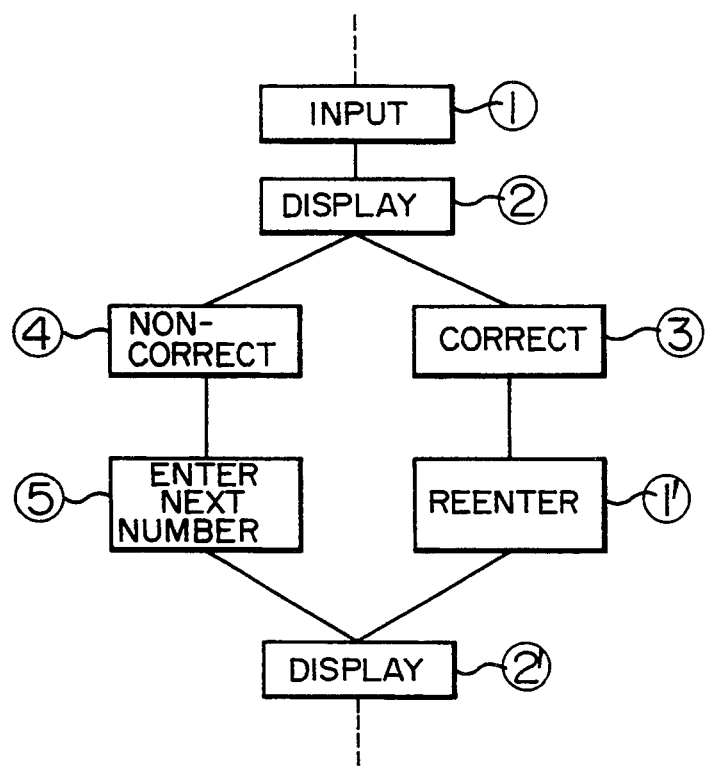
FIG. 9B shows a flow chart of a display process in FIG. 9A.

In the above facsimile device, the destination confirmation unit of the present invention may be used but a utilization efficiency will be further improved if a system shown in FIGS. 9A and 9B is used.

In FIG. 9A, area information is displayed as it is in the first embodiment. Whether a correction is needed or not can be entered through a confirmation button. Since the need for correction is inquired for each entry of a number, it is not necessary to clear all numbers. As shown in a flow chart of FIG. 9B, at step ①, a number (for example, a country code in overseas call) is entered, at step ②, a corresponding name (country name) is displayed, at step ③, a correction/non-correction button is depressed, at step ④, the number is reentered if the correction is needed, and the confirmation by the display is conducted, and at step ⑤, next number is entered if correction is not needed.

In the above system, however, it is necessary to depress the correction confirmation button each time the number is entered and it is a troublesome operation to the user. Alternatively, the following system may be used. Namely, when all entries have been completed, the correction/non-correction confirmation button is depressed. If the correction button is depressed, the content is displayed starting from a head portion, and if the correction is not needed for that portion, the non-correction button is depressed so that the next portion is displayed. In this manner, only the portion which needs the correction is corrected. A move button may be provided for the jump to the portion to be corrected.

An application of the present invention to an automatic number read system in a facsimile device is now explained with reference to FIGS. 10A and 10B.

Figure 10A:
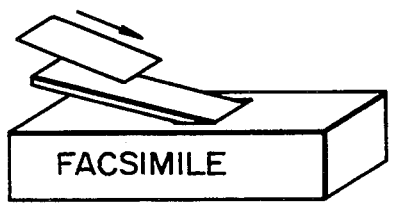
FIG. 10A illustrates automatic number read in the facsimile device.
Figure 10B:
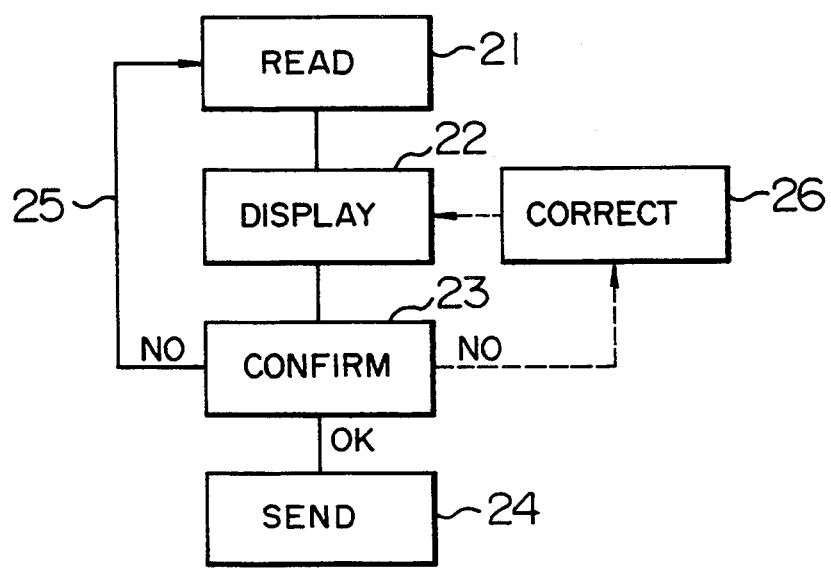
FIG. 10B shows a flow chart of a read process.

In FIG. 10A, a destination can be entered by a mark sheet at a head of a transmission document sheet. A read operation therefor is explained with reference to a flow chart of FIG. 10B. When a document sheet having a destination described thereon is set to a reader of a facsimile device, the facsimile device starts to read the destination (step 21). When the destination is read, one or both of a destination number and a destination name is displayed (step 22). An operator confirms the display content (step 23), and if the destination is correct, he/she depresses a send button (step 24). If there is an error, he/she take, out the document sheet, corrects the mark sheet and reinitiates the read operation (step 25), or if the device is equipped with a correction button as it is in the previous embodiment, he/she corrects the error by the correction button (step 26). The read operation is not limited to the mark sheet. For example, a destination name may be described in a specific column and a desired number is selected and displayed based on self-contained area information and destination name information.

In accordance with the present invention, since the area name and the destination name are displayed while the destination number is entered, the misentry of the number is prevented and the risk of the connection to a wrong station is lowered so that the operator can secure correct communication with ease. Further, since the error in the number can be corrected without resetting the entire entered number, the usability of the user is improved. When the present invention is applied to the facsimile device having the function to read the destination number, the information can be more efficiently sent to the destination.

What is claimed is:

1. A communication equipment with a destination area on-line display function comprising:

destination entry means for entering destination information;

communication means for transmitting information to a communication destination station based on the entered destination information and for receiving information from the communication destination station;

a destination dictionary file containing destination areas and destination names corresponding to destination information;

retrieval means for retrieving a destination area and a destination name from said destination dictionary file in accordance with a sequence of entry of the information from said destination entry means;

informing means for sequentially informing the retrieved information; and correction means for correcting only an error portion of said entered destination information or the content of said destination dictionary file when an error of said entered destination information or an error of the content of said destination dictionary file is detected by said informing means, wherein said destination entry means enters sequentially said destination information such as destination areas, names and telephone number of the communication destination station, said retrieval means retrieves information corresponding to said entered destination information including a part or all of the corresponding telephone number when the destination area or destination name of the communication destination station is entered, or the destination area or destination name of the corresponding communication destination station when a part or all of the telephone number is entered from said destination dictionary file, and information is transmitted by said communication means when the communication destination station is affirmed by said informing means.

2. A communication equipment according to claim 1 wherein said destination dictionary file is rewritable by content add/correct means.

3. A communication equipment according to claim 1 wherein said communication means includes means for adding to and/or correcting the content of said destination dictionary file in accordance with the transmitted information, wherein said communication means adds to and/or corrects the content of said destination dictionary file by said means for adding to and/or correcting based on information such as changed telephone number and/or changed destination area or address communication destination station transmitted thereto through a communication line.

4. A communication equipment according to claim 1 wherein said dictionary file stores at least one of country names, state names, prefecture/county names, city/town/village names and destination names together with a part of a telephone number corresponding thereto, and said destination dictionary file outputs, when retrieved by said retrieval means, a part of the telephone number or at least one of said country names, state names, prefecture/county names, city/town/village names and destination name corresponding to the entered destination information.

5. A communication equipment according to claim 1 wherein said destination dictionary file contains area maps, charges per unit time and dates and times of destination stations.

6. A communication equipment according to claim 1 wherein said informing means uses one or a combination of display and voice.

7. A communication equipment according to claim 6 wherein said informing means is display means, and a predetermined symbol displayed on said display means is selected by a mouse, a light pen or a touch panel so that said display means also functions as said destination entry means for entering the destination information.

8. A communication equipment according to claim 1 wherein the communication is started after the destination area and the destination name have been displayed and a confirmation signal has been entered by an operator through said entry means.

9. A facsimile device comprising:

decoding means for converting encoded image information transmitted from a destination station to an image signal;

printing means for printing the converted image information on an printing sheet;

reading means for reading image information recorded on a document sheet to be transmitted to the destination station;

encoding means for encoding image information;

destination entry means for entering destination information;

communication means for transmitting information to a communication destination station based on the entered destination information and for receiving information from the communication destination station;

a destination dictionary file containing destination areas and destination names corresponding to the destination information;

retrieval means for retrieving a destination area and a destination name from said destination dictionary file in accordance with a sequence of entry of the information from said destination entry means;

information means for sequentially informing the retrieved information; and correction means for correcting only an error portion of said entered destination information or the content of said destination dictionary file when an error of said entered destination information or an error of the content of said destination dictionary file is detected by said informing means, wherein said destination entry means enters sequentially said destination information such as destination areas, names and telephone number of the communication destination station, said retrieval means retrieves information corresponding to said entered destination information including a part or all of the corresponding telephone number when the destination area or destination name of the communication destination station is entered, or the destination area or destination name of the corresponding communication destination station when a part or all of the telephone number is entered from said destination dictionary file, and information is transmitted by said communication means when the communication destination station is affirmed by said informing means.

10. A facsimile device according to claim 9 wherein said destination entry means is built in said reading means, reads the destination recorded on a portion of the document sheet, compares the same with said destination dictionary file, displays the comparison result, and if there is an entry error, causes the destination information to be reentered and reads it again, or causes only the error portion to be corrected by a correction button.

11. A facsimile device according to claim 9 wherein said destination dictionary file comprises a destination area dictionary and a destination name dictionary, and the content of the destination name dictionary is updated by said destination entry means.

* * * * *